US008540305B2

(12) United States Patent
Schulte et al.

(10) Patent No.: US 8,540,305 B2
(45) Date of Patent: Sep. 24, 2013

(54) HOLLOW TORQUE ROD FOR A CLOSURE PANEL

(75) Inventors: Edward L. Schulte, White Lake, MI (US); Balakrishna Chinta, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 106 days.

(21) Appl. No.: 13/069,459

(22) Filed: Mar. 23, 2011

(65) Prior Publication Data

US 2012/0242109 A1 Sep. 27, 2012

(51) Int. Cl.
*B62D 33/03* (2006.01)

(52) U.S. Cl.
USPC ...................... 296/183.1; 296/76; 296/146.11

(58) Field of Classification Search
USPC ......... 296/50, 56, 76, 146.11, 183.1; 49/386; 16/308
IPC ........................................................ B62D 33/03
See application file for complete search history.

(56) References Cited

U.S. PATENT DOCUMENTS 3,476,375 A * 11/1969 Brasseur ........................ 267/277
4,199,177 A * 4/1980 Danzer .......................... 292/144
4,739,585 A * 4/1988 Pickles ............................ 49/280
5,129,171 A * 7/1992 Arbter et al. .................. 38/102.2
5,358,301 A * 10/1994 Konchan et al. ........... 296/146.1
5,489,134 A * 2/1996 Furuki et al. .................... 296/76
5,746,468 A * 5/1998 Schoen et al. .................. 296/76
5,775,764 A * 7/1998 Yamashita ...................... 296/76
5,823,022 A * 10/1998 Barker .......................... 70/38 A
5,951,088 A * 9/1999 Schoen et al. .................. 296/76
6,343,405 B1 * 2/2002 Carson ............................ 16/308
6,637,796 B1 * 10/2003 Westerdale et al. .......... 296/57.1
6,793,263 B1 * 9/2004 Bruford et al. .................. 296/50
6,846,030 B2 * 1/2005 Koehler et al. ................. 296/50
6,874,837 B2 * 4/2005 Bruford et al. .................. 296/50
7,490,888 B2 * 2/2009 Zagoroff ...................... 296/57.1
7,699,378 B2 * 4/2010 Smith et al. .................. 296/57.1
7,743,466 B2 * 6/2010 Tu et al. .......................... 16/308
2011/0227307 A1 * 9/2011 Nataraj et al. ............. 280/124.1

* cited by examiner

*Primary Examiner* — Glenn Dayoan
*Assistant Examiner* — Pinel Romain
(74) *Attorney, Agent, or Firm* — Quinn Law Group, PLLC

(57) ABSTRACT

A compartment includes a plurality of side walls and a floor configured to define a storage area. The compartment also includes a panel operatively connected to the floor or to at least one of the plurality of side walls. The panel is configured to selectively expand and restrict access to the storage area. The compartment additionally include a torque rod having a wall thickness, a hollow interior, a first end fixed relative to the storage area and a second end fixed relative to the panel. The torque rod is configured to store energy by being twisted when the panel is pivoted in a first direction relative to the storage area and release the stored energy when the panel is pivoted in a second direction that is opposite to the first direction to thereby assist operation of the panel. A vehicle employing such an enclosure is also provided.

20 Claims, 4 Drawing Sheets

HOLLOW TORQUE ROD FOR A CLOSURE PANEL

TECHNICAL FIELD

The present disclosure is drawn to a hollow torque rod for a closure panel.

BACKGROUND

A panel may be employed as a cover for a defined area to generate an enclosed compartment. Such a closure panel may be pivotably attached to the compartment for improved convenience during the panel's operation. Pivotable closure panels are commonly employed in vehicles for covering passenger, powertrain, and cargo compartments. A pivotable closure panel may be aided by a force-assist mechanism to facilitate the panel's operation during opening and/or closing of a compartment. Accordingly, a force-assist mechanism may increase operator convenience by reducing the effort required to open or close a compartment and may permit the use of a heavier closure panel.

SUMMARY

A compartment includes a plurality of side walls and a floor configured to define a storage area. The compartment also includes a panel operatively connected to the floor or to at least one of the plurality of side walls. The panel is configured to selectively expand and restrict access to the storage area. The compartment additionally includes a torque rod having a wall thickness, a hollow interior, a first end fixed relative to the storage area and a second end fixed relative to the panel. The torque rod is configured to store energy by being twisted when the panel is pivoted in a first direction relative to the storage area and release the stored energy when the panel is pivoted in a second direction that is opposite to the first direction to thereby assist operation of the panel.

The compartment may be a bed of a pick-up truck. In such a case, the panel may be a tailgate configured to selectively open and close access to the bed. The compartment may also be a trunk area of a vehicle, and, in such a case, the panel may be a trunk lid configured to selectively open and close access to the trunk area.

At least one of the first and second ends of the torque rod may include a compressed, substantially flat section. In such a case, the substantially flat section may be fixed relative to the storage area or to the panel, respectively.

Additionally, at least one of the first and second ends of the torque rod may include a solid segment, wherein the solid segment is at least one of pressed and welded into the hollow interior. The solid segment may include a keyed section, wherein the keyed section may be fixed relative to the storage area or to the panel, respectively.

The second end of the torque rod may include a formed loop and the formed loop of the second end may then be secured to the panel.

The compartment may also include a bracket fixed to at least one of the plurality of side walls and the floor. The first end of the torque rod may then be inserted into and be fixedly engaged by the bracket.

The first end of the torque rod may include a flange. The flange may then be fastened to at least one of the plurality of side walls and the floor.

The compartment may additionally include a hinge mechanism configured to pivotably connect the panel to one of the plurality of side walls and the floor. In such a case, the second end of the hollow torque rod may be fixed to the hinge mechanism.

A vehicle employing such a compartment is also provided.

The above features and advantages and other features and advantages of the present invention are readily apparent from the following detailed description of the best modes for carrying out the invention when taken in connection with the accompanying drawings.

DETAILED DESCRIPTION

Figure 1:
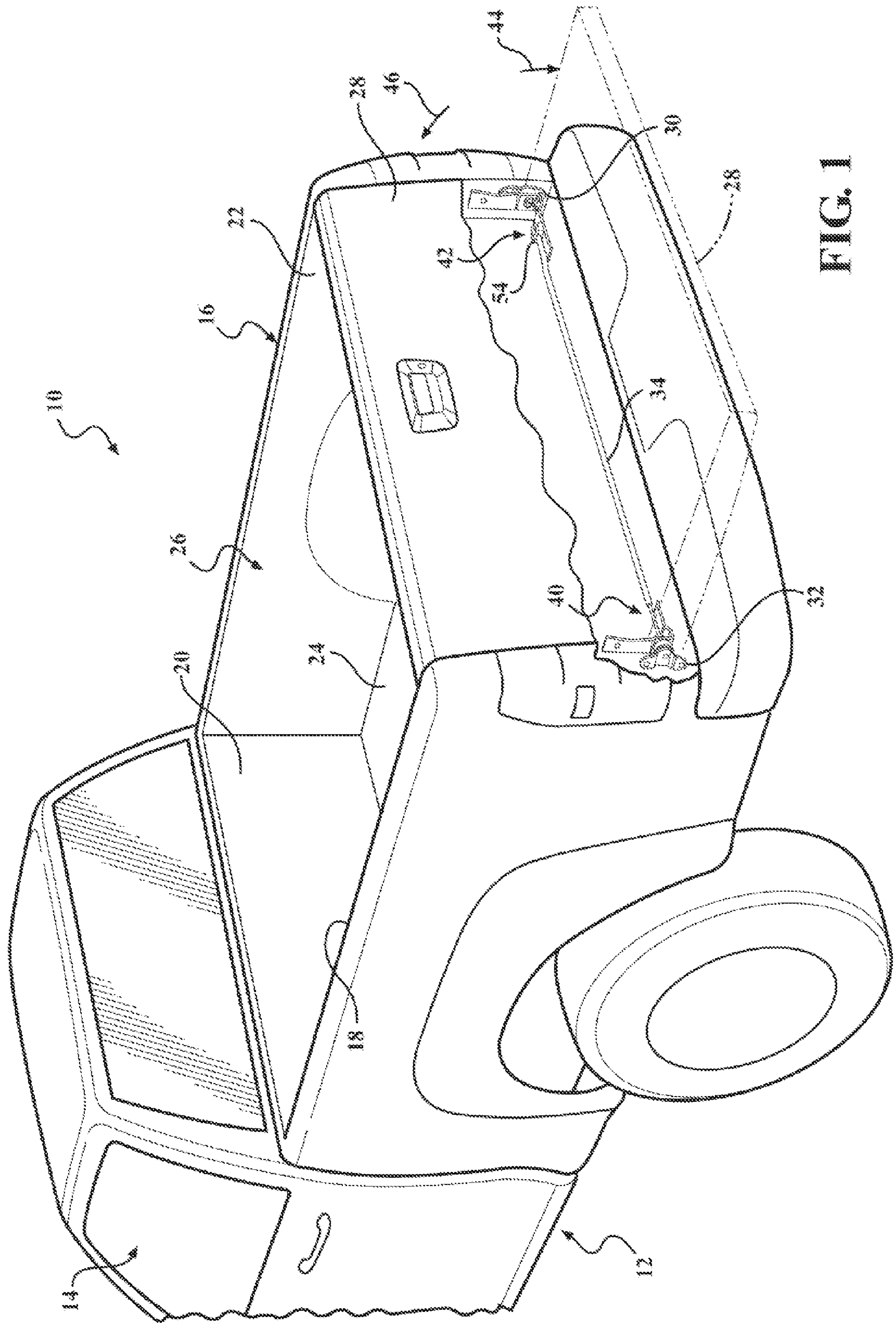
FIG. 1 is a cut-away rear perspective view of a vehicle having a storage compartment that includes a pivotable panel and a torque rod providing an assist force during operation of the panel, wherein the compartment is configured as a pick-up truck bed and the panel is configured as a tailgate.

Referring to the drawings, wherein like reference numbers refer to like components, FIG. 1 shows a vehicle 10 depicted as a pick-up truck. The vehicle 10 includes a vehicle body 12. The vehicle body 12 defines a passenger compartment 14 and a storage compartment 16. As shown in FIG. 1, the storage compartment 16 is configured as a bed of a pick-up truck and is generally adapted to carry bulky cargo.

The storage compartment 16 of FIG. 1 is enclosed on four sides but, as shown, may be arranged without a top cover, and therefore remain unrestricted from above. The storage compartment 16 includes a plurality of generally vertical perimeter walls, shown as a side wall 18, a side wall 20, and a side wall 22. The storage compartment 16 also includes a floor 24. The side walls 18, 20, 22, and the floor 24 are together configured to define a storage area 26. The storage compartment 16 also includes a panel 28. As shown in FIG. 1, the panel 28 is configured in one possible embodiment as a tailgate that is pivotably connected to the side walls 18 and 22 via bearing flanges 30 and 32, respectively. Each of the flanges 30, 32 may be fastened to the respective walls 18, 22 via any appropriate fastener(s), such as a pair of screws (not shown). Alternatively, the panel 28 may also be pivotably connected to the floor 24 via an appropriate hinge mechanism (not shown). Accordingly, when pivoted, the panel 28 selectively expands and restricts access to the storage area 26.

The storage compartment 16 additionally includes a torque rod 34. The torque rod 34 is characterized by a cross-section having an outer diameter 35, a wall thickness 36, and a hollow interior 38. The torque rod 34 also has a first end 40 fixed relative to the storage area 26, a second end 42 fixed relative to the panel 28, and a predetermined length 43 that spans the distance between the first end 40 and the second end 42. The torque rod 34 is configured to store energy by being twisted when the panel 28 is pivoted in a first direction relative to the storage area 26, wherein the first direction is identified by an arrow 44. The torque rod 34 is formed from a suitable material that is capable of elastically withstanding torsion without taking a permanent set while being worked during operation of the panel 28, for example spring steel. The torque rod 34 is also configured to release the stored energy when the panel 28 is pivoted in a second direction after being previously twisted in the first direction 44, wherein the second direction is identified by an arrow 46. As may be seen from FIG. 1, the second direction 46 is opposite to the first direction 44. Accordingly, the release of the stored energy by the torque rod 34 when the panel 28 is pivoted in the second direction 46 provides a force assist for the operation of the panel.

Figure 2:
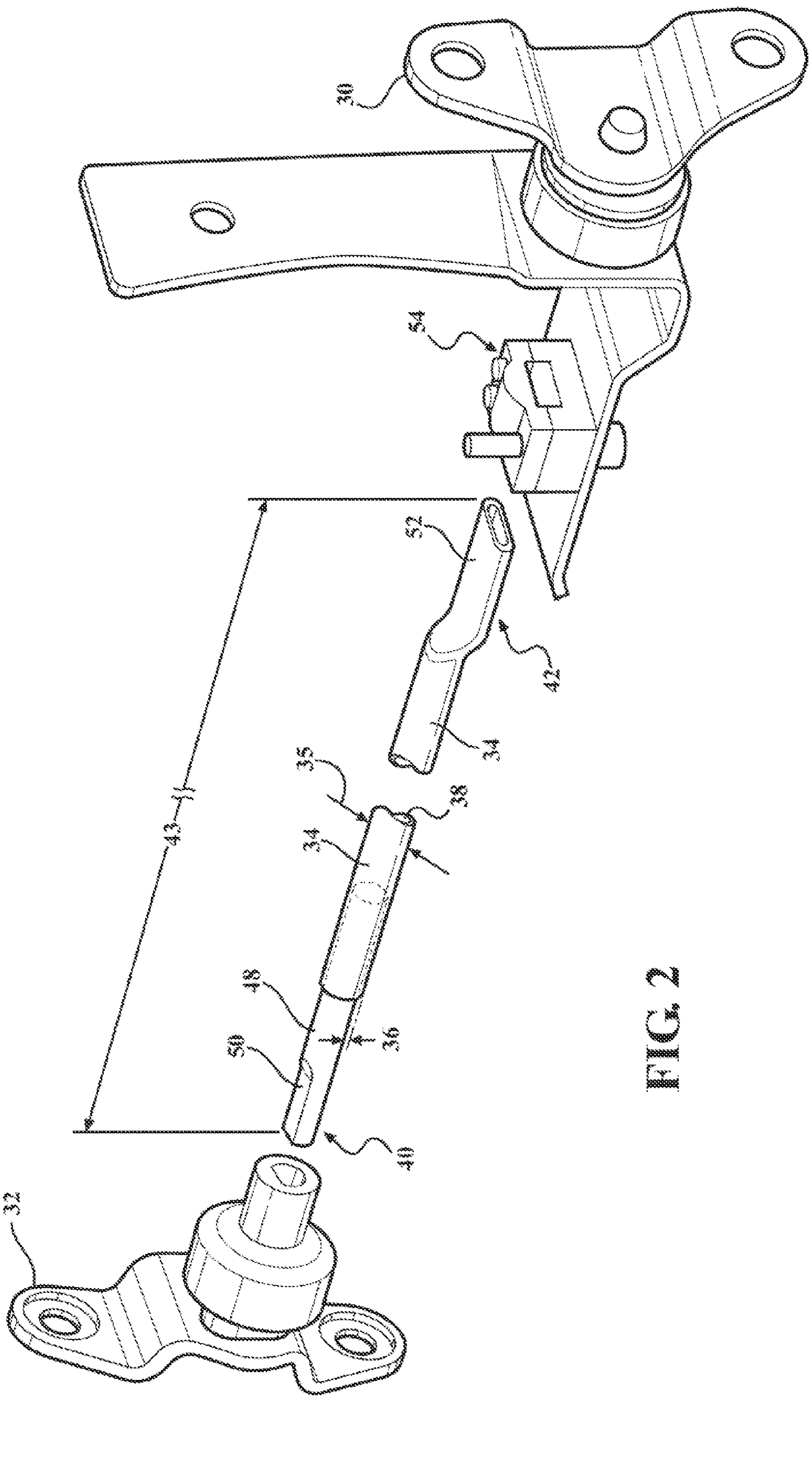
FIG. 2 is a detailed close-up partially exploded perspective view of the torque rod shown in FIG. 1.

In order to achieve the desired force to assist the operation of the panel 28, each of the first end 40 and the second end 42 is specifically configured in order to fix the first end relative to the storage area 26 and second end relative to the panel 28. As shown in FIG. 2, the first end 40 may include a solid segment 48 with a keyed section 50, wherein the solid segment is fixed inside the hollow interior 38. The solid segment 48 may first be inserted into the hollow interior 38, and then be either pressed or welded therein. The first end 40 is then fixed to the bearing flange 32 via the keyed section 50, such that the flange 32 effectively becomes part of the first end. As additionally shown in FIG. 2, the second end 42 of the torque rod 34 may include a compressed, substantially flat section 52. The substantially flat section 52 may then be clamped to the panel 28 via a fastening device 54, thus restricting movement of the second end 42 relative to the panel. Furthermore, each of the first and second ends 40 and 42 may include either the solid segment 48 with a keyed section 50 or the compressed, substantially flat section 52 fixed inside the hollow interior 38 depending on the retention requirements of each end.

When the panel 28 is pivoted in the first direction 44 from the position where access to the storage area 26 is restricted, the torque rod 34 is twisted because while the first end 40 is securely tied to the side wall 18, the second end 42 is rotated with the panel. The action of operating the panel 28 to expand the storage area 26 stores energy in the torque rod 34 under the mass of the panel being lowered in the first direction 44. Conversely, when then panel 28 is operated in the second direction 46 to restrict access to the storage area 26, the torque rod 34 is permitted to release the stored energy and thus assist with raising the panel. The overall diameter 35, the wall thickness 36, and the length 43 are all selected to provide the torque rod 34 with a desired spring rate such that the twisting of the torque rod may generate a useful force assist in raising the panel 28.

Figure 3:
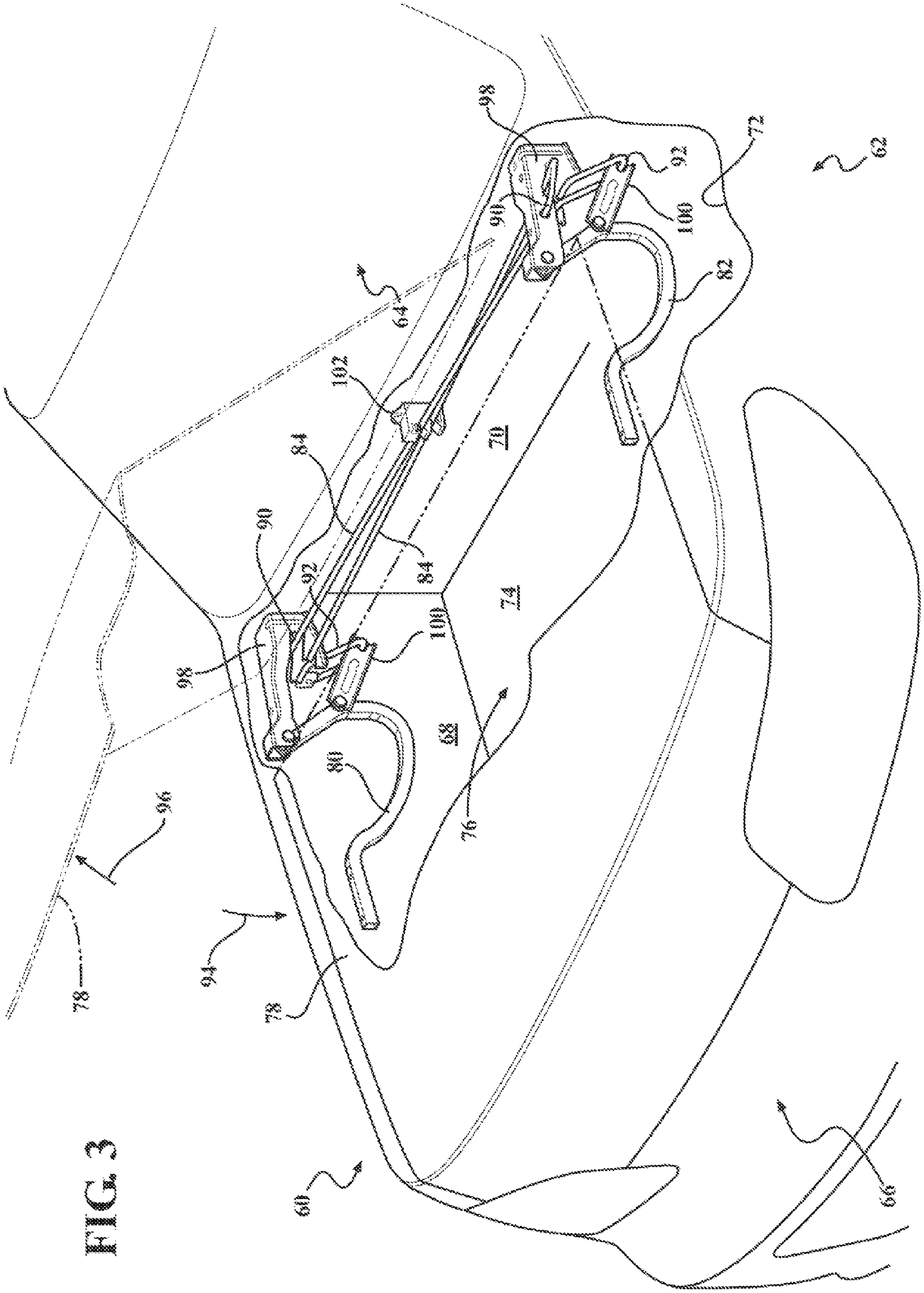
FIG. 3 is a cut-away rear perspective view of a vehicle having a compartment that includes a pivotable panel and an alternative embodiment of the torque rod shown in FIG. 1, wherein the compartment is configured as a trunk area and the panel is configured as a trunk lid.
Figure 4:
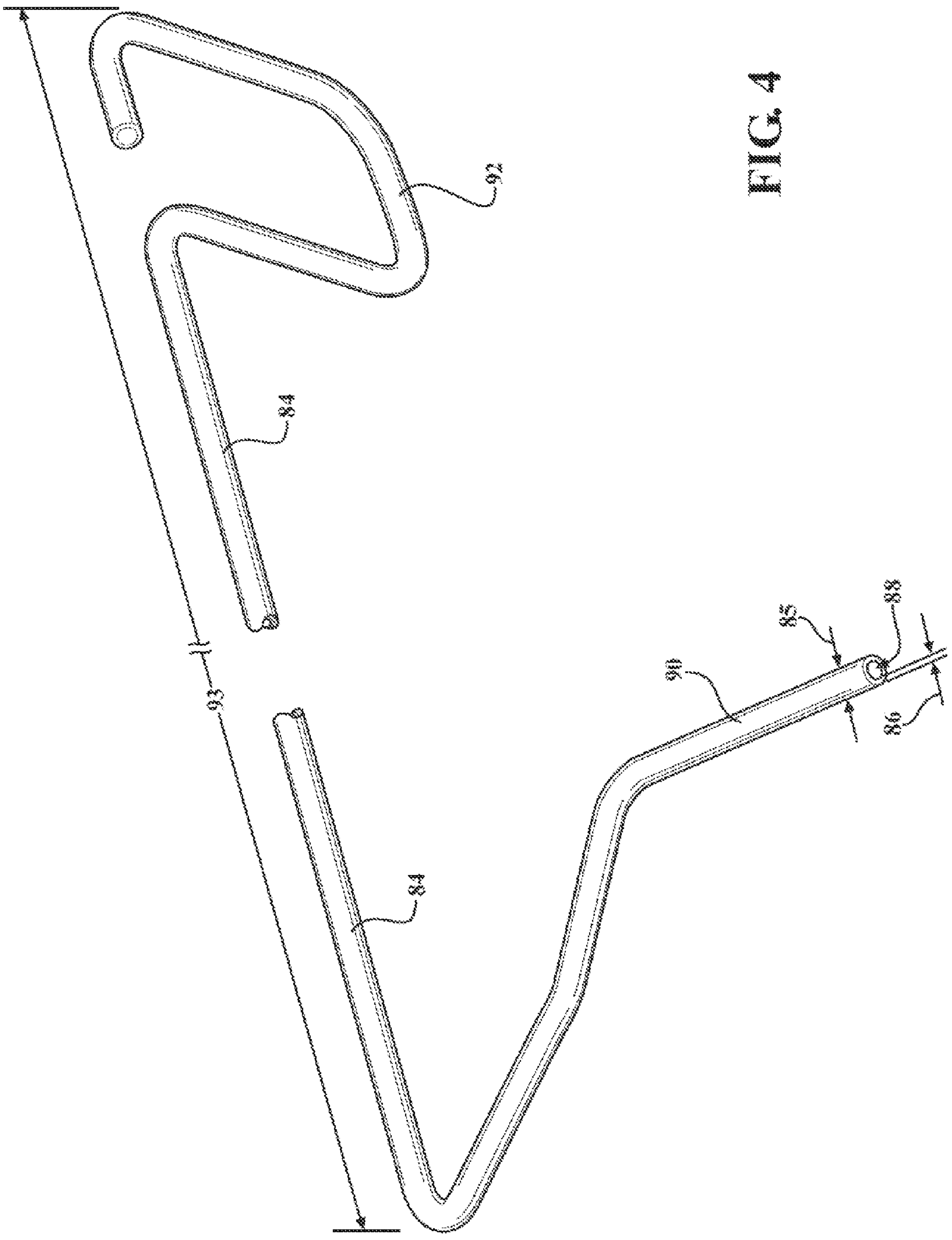
FIG. 4 is a detailed close-up partially exploded perspective view of the torque rod shown in FIG. 3.

FIG. 3 illustrates a vehicle 60 including a vehicle body 62 that has a passenger compartment 64 and a storage compartment 66 that is configured as a trunk area 66. The storage compartment 66 includes a plurality of generally vertical perimeter walls, shown as a side wall 68, a side wall 70, and a side wall 72. The storage compartment 66 also includes a floor 74. The side walls 68, 70, 72, and the floor 24 are together configured to define a storage area 76. The storage compartment 66 also includes a panel 78. As shown in FIG. 3, the panel 78 is configured as a trunk lid that is pivotably connected to the wall 70 via a hinge mechanism that includes hinges 80 and 82. Accordingly, when pivoted, the panel 78 selectively expands and restricts access to the storage area 76.

The storage compartment 66 additionally includes a pair of torque rods 84. Each of the torque rods 84 has a generally similar function and structure to the torque rod illustrated and described with respect to FIGS. 1-2. Two torque rods 84 are being used in the application of FIG. 3 in order to balance out the reaction forces being seen at each hinge 80 and 82 from the twisting action of the respective torque rods, such that the panel 78 is not being lifted or raised unevenly. Each torque rod 84 is characterized by a cross-section having an outer diameter 85, a wall thickness 86, and a hollow interior 88. Each torque rod 84 also has a first end 90 fixed relative to the storage area 76, a second end 92 fixed relative to the panel 78, and a predetermined length 93 that spans the distance between the first end 90 and the second end 92.

The torque rods 84 are configured to store energy by being twisted when the panel 78 is pivoted in a first direction relative to the storage area 76, wherein the first direction is identified by an arrow 94. Like the torque rod 34 of FIGS. 1-2, each torque rod 84 is formed from a material capable of elastically withstanding torsion without taking a permanent set while being worked during operation of the panel 78. Torque rods 84 are also configured to release the stored energy when the panel 78 is pivoted in a second direction after being previously twisted in the first direction 94, wherein the second direction is identified by an arrow 96 and is opposite to the first direction 44. Accordingly, similar to the torque rod 34, the release of the stored energy by torque rods 84 when the panel 78 is pivoted in the second direction 96 provides a force assist for the operation of the panel.

As shown in FIG. 3, the storage compartment 66 additionally includes a pair of brackets 98. Each bracket is fixed to the side wall 70, as shown, or may be fixed to a shelf (not shown) that spans the distance between the side walls 68 and 72. Each first end 90 includes a shape that is specifically configured to be inserted into and be fixedly engaged by the respective bracket 98. Each second end 92 of the torque rods 84 is rotatably fixed to the respective hinge 80 and 82 via a link 100. Each link 100 captures an individual second end 92 and is configured to urge the respective second end in the first direction 94 to thereby twist the respective torque rod 84 during operation of the panel 78. Either of the second ends 92 may also be directly connected to the respective hinge 80 without using the link 100 such that the hinge itself induces the required twist in the torque rod 84. To facilitate the capture of the second end 92 by the respective link 100, each second end may include a formed loop that is engaged by the respective link. Accordingly, each first end 90 is fixed relative to the storage area 76 and each second end 92 is fixed relative to the panel 78 such that a desired assist force may be achieved during operation of the panel 78 in the second direction 96. Additionally, as shown in FIG. 3, the storage compartment 66 may also include a holder 102. The holder 102 may be fixed relative to the storage area 76 by being fastened to the side wall 70 in order to contain the torque rods 84 and prevent the torque rods from rubbing against one another during operation of the panel 78.

When necessary for retention of the first and second ends 90, 92, the first and second ends of the torque rods 84 may be provided with the configurations disclosed above for the first and second ends 40, 42 of the torque rod 34. Accordingly, each of the first and second ends 90 and 92 may include either a compressed, substantially flat section 48 or a solid segment 50 with a keyed section 52 fixed inside the hollow interior 88.

When the panel 78 is pivoted in the first direction 94 from the position where access to the storage area 76 is expanded, each torque rod 84 is twisted. The twisting of each torque rod 84 is induced in response to each second end 92 being rotated with the panel while each first end 90 is securely tied to the stationary part of the compartment 66, such as the side wall 70. The action of operating the panel 78 to restrict the storage area 76 stores energy in the torque rod 34 under the mass of the panel being lowered in the first direction 94. Conversely, when then panel 78 is operated in the second direction 96 in order to restrict access to the storage area 66, each torque rod 84 is permitted to release the stored energy and thus assist with raising the panel. The overall diameter 85, the wall thickness 86, and the length 93 are all selected to provide the torque rod 84 with a desired spring rate such that the twisting of the torque rod may generate a useful force assist in raising the panel 78.

Generally, either storage compartment 16 or 66 may employ the torque rod configuration and attachment method disclosed with respect to the other compartment. However, despite all the possible configurations, each of the torque rods 34 and 84 employ a hollow interior, 38 and 88, respectively. The hollow interiors 38 and 88 permit the torque rods 34 and 84 to generate appropriate force assist for operation of the respective panels 28 and 78 at reduced weight but without loss in durability as compared with a torque rod having a solid core.

While the best modes for carrying out the invention have been described in detail, those familiar with the art to which this invention relates will recognize various alternative designs and embodiments for practicing the invention within the scope of the appended claims.

The invention claimed is:

1. A compartment comprising:

a plurality of side walls and a floor configured to define a storage area;

a panel operatively connected to one of the floor and at least one of the plurality of side walls, and configured to selectively expand and restrict access to the storage area; and a torque rod having a wall thickness, a hollow interior, a first end fixed relative to the storage area and a second end fixed relative to the panel;

wherein the torque rod is configured to store energy by being twisted when the panel is pivoted in a first direction relative to the storage area and release the stored energy when the panel is pivoted in a second direction that is opposite to the first direction to thereby assist operation of the panel; and wherein at least one of the first and second ends of the torque rod includes a compressed, substantially flat portion.

2. The compartment of claim 1, wherein the compartment is a bed of a pick-up truck and the panel is a tailgate configured to selectively open and close access to the bed.

3. The compartment of claim 1, wherein the compartment is a trunk area of a vehicle and the panel is a trunk lid configured to selectively open and close access to the trunk area.

4. The compartment of claim 1, wherein the substantially flat section is fixed relative to one of the storage area and the panel.

5. The compartment of claim 1, wherein at least one of the first and second ends of the torque rod includes a solid segment, wherein the solid segment is at least one of pressed and welded into the hollow interior, and wherein the solid segment includes a keyed section fixed relative to the storage area or to the panel, respectively.

6. The compartment of claim 1, wherein the second end of the torque rod includes a formed loop which is secured to the panel.

7. The compartment of claim 1, further comprising a bracket fixed to at least one of the plurality of side walls and the floor, wherein the first end of the torque rod is inserted into and is fixedly engaged by the bracket.

8. The compartment of claim 1, wherein the first end of the torque rod includes a flange which is fastened to at least one of the plurality of side walls and the floor.

9. The compartment of claim 1, further comprising a hinge mechanism configured to pivotably connect the panel to one of the plurality of side walls and the floor.

10. The compartment of claim 9, wherein the second end of the torque rod is fixed to the hinge mechanism.

11. A vehicle comprising:

a passenger compartment; and a storage compartment having:

a plurality of side walls and a floor configured to define a storage area;

a panel operatively connected to at least one of the floor and at least one of the plurality of side walls, and configured to selectively expand and restrict access to the storage area; and a torque rod having a wall thickness, a hollow interior, a first end fixed relative to the storage area and a second end fixed relative to the panel;

wherein the torque rod is configured to store energy by being twisted when the panel is pivoted in a first direction relative to the storage area and release the stored energy when the panel is pivoted in a second direction that is opposite to the first direction to thereby assist operation of the panel; and wherein at least one of the first and second ends of the torque rod includes a compressed, substantially flat portion.

12. The vehicle of claim 11, wherein the storage compartment is a bed of a pick-up truck and the panel is a tailgate configured to selectively open and close access to the bed.

13. The vehicle of claim 11, wherein the storage compartment is a trunk area of a vehicle and the panel is a trunk lid configured to selectively open and close access to the trunk area.

14. The vehicle of claim 11, wherein the substantially flat section is fixed relative to one of the storage area and the panel.

15. The vehicle of claim 11, wherein at least one of the first and second ends of the torque rod includes a solid segment, wherein the solid segment is at least one of pressed and welded into the hollow interior, and wherein the solid segment includes a keyed section fixed relative to the storage area or to the panel, respectively.

16. The vehicle of claim 11, wherein the second end of the torque rod includes a formed loop which is secured to the panel.

17. The vehicle of claim 11, further comprising a bracket fixed to at least one of the plurality of side walls and the floor, wherein the first end of the torque rod is inserted into and is fixedly engaged by the bracket.

18. The vehicle of claim 11, wherein the first end of the torque rod includes a flange, which is fastened to at least one of the plurality of side walls and the floor.

19. The vehicle of claim 11, wherein the storage compartment additionally includes a hinge mechanism configured to pivotably connect the panel to one of the plurality of side walls and the floor.

20. The vehicle of claim 19, wherein the second end of the torque rod is fixed to the hinge mechanism.

* * * * *